United States Patent
Yoshikawa et al.

(10) Patent No.: US 6,393,520 B2
(45) Date of Patent: *May 21, 2002

(54) DATA PROCESSOR AND DATA PROCESSING SYSTEM WITH INTERNAL MEMORIES

(75) Inventors: Takefumi Yoshikawa, Shiga; Hironori Akamatsu; Satoshi Takahashi, both of Osaka, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,331

(22) Filed: Apr. 17, 1998

(30) Foreign Application Priority Data

Apr. 17, 1997 (JP) ............................................. 9-099905

(51) Int. Cl.[7] ............................................. G06F 12/00
(52) U.S. Cl. ........................ 711/119; 711/119; 711/202
(58) Field of Search ................................ 711/117, 149, 711/141, 136, 160, 165, 118–146; 712/32; 345/521, 526

(56) References Cited

U.S. PATENT DOCUMENTS

| | | | | |
|---|---|---|---|---|
| 5,159,678 A | * | 10/1992 | Wengelski et al. | 711/153 |
| 5,185,878 A | | 2/1993 | Baror et al. | 711/123 |
| 5,388,242 A | * | 2/1995 | Jewett | 711/113 |
| 5,564,035 A | * | 10/1996 | Lai | 711/144 |
| 5,765,196 A | * | 6/1998 | Liencres et al. | 711/143 |

FOREIGN PATENT DOCUMENTS

| | | |
|---|---|---|
| JP | 59-13919 | 8/1984 |
| JP | 63-266572 | 11/1988 |
| JP | 01015835 | 1/1989 |
| JP | 01191967 | 2/1989 |
| JP | 02278475 | 11/1990 |
| JP | 03125253 | 5/1991 |
| JP | 03175545 | 7/1991 |
| JP | 04120641 | 4/1992 |
| JP | 04150147 | 5/1992 |
| JP | 05134909 | 6/1993 |
| JP | 05151157 | 6/1993 |
| JP | 05324539 | 7/1993 |
| JP | 6-28246 | 2/1994 |
| JP | 06290109 | 10/1994 |
| JP | 7-160574 | 6/1995 |
| JP | 07182232 | 7/1995 |

\* cited by examiner

*Primary Examiner*—Matthew Kim
*Assistant Examiner*—Denise Tran
(74) *Attorney, Agent, or Firm*—McDermott, Will & Emery

(57) ABSTRACT

A processing unit for carrying out specified data processing operations while performing read/write operations on data in an internal memory is coupled to a memory control unit for performing read/write operations on data in an external memory. Data exchange is carried out between the internal and external memories through the memory control unit. Data requiring a longer processing time or data frequently accessed is mapped into the internal memory in accordance with the data exchange, thereby improving overall memory system performance.

13 Claims, 15 Drawing Sheets

DATA PROCESSOR AND DATA PROCESSING SYSTEM WITH INTERNAL MEMORIES

BACKGROUND OF THE INVENTION

The present invention relates to a data processor with an internal (built-in) memory operable to perform specified data processing operations, such as analytical operations and numerical arithmetic operations, while reading/writing data (including programs such as instructions) from/into the internal memory.

A so-called memory-incorporated data processor, in which a processing unit and an internal memory (a DRAM (dynamic random access memory) in particular) are formed on a single chip, has recently been developed. In such an arrangement, data can be transferred at a considerably high bit rate, because the processing unit and the internal memory can be connected together via a short data bus having a broad bit width. Accordingly, high-speed data processing can be performed while making full use of the performance of the processing unit.

For example, when such a data processor is applied to a video controller, the internal memory may be used as a frame buffer for video. The video data stored in the frame buffer can be processed at high speed in the processing unit and then supplied through a D/A (digital-to-analog) converter to an external monitor. This makes it possible to provide smooth video images.

In some applications of the data processor, however, required storage capacity cannot be obtained by the internal memory alone. For instance, if the number of colors or the size of a monitor is increased in image processing applications, then the internal memory alone cannot provide sufficient storage capacity for constructing a frame buffer. As an imaginable solution, an internal memory having a relatively great storage capacity may be mounted beforehand in order to cope with various cases. However, such a solution is not cost-effective. Thus, in such a case, an external memory is optionally added, thereby obtaining a desired storage capacity by using the internal and external memories in combination.

However, if such an external memory is added, then a memory system is made up of the internal and the external memories. Thus, the overall performance of the memory system is determined by the access rate of the external memory after all. Although the internal memory is provided, it is hard to improve the overall performance, resulting in several problems. For example, in image processing applications, video image rendering rate becomes adversely low and motions of the image become undesirably awkward.

SUMMARY OF THE INVENTION

The objective of the present invention is providing a data processor, incorporating an internal memory allowing for the improvement of overall memory system performance, for a memory system made up of an internal memory and an external memory having an operating speed lower than that of the internal memory.

In order to solve the above-described problem of the prior art techniques, the present invention provides an improved data processor. In the data processor of the present invention, a memory control unit for performing read/write operations on an external memory and a buffer part for storing data from an internal memory or from the external memory are controllably coupled to a processing unit, thereby carrying out data exchange between the internal memory and the external memory by temporarily storing, in the buffer part, data from the internal memory or from the external memory.

In the data processor of the present invention, either data obtained from the external memory through the memory control unit or data obtained from the internal memory is temporarily stored in the buffer part, and physical data exchange can be carried out between the internal memory and the external memory. Thus, it is possible to store data requiring fast processing in the internal memory and data not requiring so fast processing in the external memory, respectively. As a result, the overall memory system performance can be improved when degrees of necessity of high speed processing are variable among access areas (memory regions) of a memory system. In general, in the case of transferring data between an external memory (main memory) and an internal memory (cache memory), data in the internal memory is copied to the external memory without applying any modification thereto. Also, even in the case of swapping data between an internal memory (main memory) and an external memory (a magnetic disk device) in a virtual memory system, data in the internal memory is also copied to the external memory without applying any modification thereto. In other words, in both of these cases, a region corresponding to the internal memory always exists in the external memory. However, in the data processor of the present invention, no such regions corresponding to the internal memory exist in the external memory. Therefore, a sum of the storage capacity of the external memory and that of the internal memory can be used as a memory space without wasting any memory region.

The present invention is also characterized in that the processing unit includes an address management part for controlling addresses of said internal and external memories. When data exchange is performed between said internal memory and the external memory, address allocations corresponding to the data exchange are exchanged by the address management part. Thus, even if data has been exchanged between arbitrary physical addresses, the logical addresses remain unchanged in spite of such data exchange. Therefore, it is not necessary to reform a logical memory map of the memory system.

In one embodiment of the present invention, the memory control unit may be provided with an additional function of performing data conversion in parallel or in series between the internal memory and the external memory. And the processing unit and the memory control unit may be coupled together via a data bus having the same width as a width of a data bus between the internal memory and the processing unit. In such arrangement, the processing unit need not convert data, provided from the internal memory through a data bus having a width and coupling the processing unit to the internal memory, into data corresponding to a width of a data bus between the processing unit and the memory control unit, in order to output the data to the memory control unit. As a result, the load of the processing unit can be lightened, and a data bus having the same width can be used in common between the processing unit and the internal memory and between the processing unit and the memory control unit.

In another embodiment of the present invention, the memory control unit or the processing unit may be provided with a comparator for comparing a data item from the internal memory with another data item from the external memory. If the comparator indicates that these data items are different from each other, the data items may be written into the internal memory or into the external memory, thereby exchanging the data items between the internal memory and the external memory. In such an arrangement, if the comparator indicates that these items are the same, a write cycle need not be activated with respect to the internal and external memories. Thus, the processing load and time required for performing data exchange can be reduced.

In still another embodiment, the memory control unit or the processing unit may be provided with an arithmetic part for performing data arithmetic operations on the data from the internal and external memories. For example, if the data processor of the invention is applied to an MPEG (moving picture experts group) encoder and I/B/P pictures stored in the internal memory and in the external memory are different from each other, it is possible to perform inter-picture data arithmetic operations when data is exchanged between the internal memory and the external memory. As a result, it is possible to store post-arithmetic picture data in at least one of the memories during the data exchange.

In still another embodiment, the data exchange may be carried out with respect to a memory region having a specified storage capacity. And data exchanges may be carried out between the internal memory and the external memory in order that memory regions frequently accessed by the processing unit and memory regions infrequently accessed by the processing unit are located in the internal memory and in the external memory, respectively. In such arrangement, if some memory regions of a memory system are locally accessed more frequently than other regions during a specified period of time, then the memory regions frequently accessed can be located in the internal memory at an arbitrary point in time. As a result, the overall memory system performance can be improved.

In still another embodiment, the processing unit or the memory control unit may be provided with tag memories. Each of the tag memories stores a value indicating how may times each memory region of the internal memory or the external memory is accessed. Data exchange may be carried out between each memory region of the internal memory and an associated memory region of the external memory by making reference to a corresponding value stored in the tag memory. In such an arrangement, if counting up is carried out in each of the tag memories provided for the respective memory regions every time each memory region is accessed, then it is easy to know as a whole how many times each memory region has been accessed. Accordingly, data exchange can be carried out with higher precision on the basis of a memory region.

In still another embodiment, each of tag memories may include: a tag comparator part for receiving a memory address from the processing unit to decide which memory region is an object of access; and a memory count part for receiving a trigger signal from the tag comparator part to perform count-up operations. In such an arrangement, if a memory address from the processing unit is provided to the tag comparator part, then count-up operations are automatically performed in the memory count part. Accordingly, the processing unit or the memory control unit need not examine memory addresses one by one to decide which memory region is to be accessed and store a value indicating how many times the memory region has been accessed. As a result, the processing load of the processing unit or memory control unit can be lightened.

In still another embodiment, the processing unit or the memory control unit may be provided with a buffer memory having a storage capacity greater than that of the memory region. Data exchange may be carried out between the internal memory and the external memory by temporarily writing data into the buffer memory. In such an arrangement, data can be exchanged between memory regions by: (i) continuously reading out data from a memory region in one of the internal and external memories and storing the data in the buffer memory; (ii) continuously writing data, stored in a memory region of the other memory, into the memory region, from which the data has been read out in (i); and (iii) continuously writing the data stored in the buffer memory into the memory region of the other memory. As a result, data can be exchanged quickly.

In still another embodiment, a plurality of such buffer memories may be provided. In such an arrangement, it is possible to store data from the internal memory and data from the external memory in the respective buffer memories by simultaneously accessing the internal and external memories. As a result, a time required for data exchange can be reduced.

In still another embodiment, data may be exchanged between the internal memory and the external memory by using a blank memory region in the external memory. In such an arrangement, data to be exchanged is temporarily written into the existing external memory. As compared with the cases of using a buffer memory, data is exchanged at a lower speed. However, the costs can be reduced even when a buffer memory is separately provided.

In still another embodiment, the processing unit or the memory control unit may be provided with identification bits for blank memory regions corresponding to respective memory regions of the external memory. In such an arrangement, the processing unit or the memory control unit can know blank memory regions of the external memory by referring to the code of the identification bits.

In still another embodiment, the memory control unit may have a plurality of access ports for accessing a plurality of external memories. And data exchange may be carried out between the external memories respectively coupled to the access ports and said internal memory. In such an arrangement, the overall memory system performance can be improved by mapping data requiring high-speed processing or specific data frequently accessed into the internal memory in memory systems of a larger size.

In still another embodiment, the data exchange is preferably carried out when data, which has been received from the internal memory or from the external memory as an object of data exchange, is being output to an external unit. In such an arrangement, while the data received from one of the internal and external memories is being output, the other memory may be usually accessed at any arbitrary addresses. Thus for example, a sequence may be performed in which (i) data to be exchanged is read from one of the memories, temporarily stored in the buffer part and then output to an external unit, (ii) data to be exchanged in the other memory is simultaneously written into the one memory, and then (iii) the data stored in the buffer part is written into the other memory. This considerably reduces overhead involved by data exchange, thereby enhancing the effects of the present invention.

The present invention provides a data processing system, in which a plurality of data processors having the above-described configuration are coupled together through the memory control units thereof and data exchange is carried out between internal memories of the data processors. In the data processing system of the present invention, data can be exchanged between the internal memories in order that data required by the processing units of the data processors are mapped to the internal memories associated with the processing units. As a result, the overall data processing performance is improved.

The present invention also provides a data processing system. In the data processing system, memory control units of a plurality of data processors having the above-described configuration are provided with a plurality of access ports for accessing an external unit. The data processors are coupled together through the access ports thereof, and data is exchanged between internal memories of the data processors. In this data processing system, since the data processors are coupled together via a plurality of data buses, it is possible to simultaneously read/write data between data processors, in which data should be exchanged through these data buses.

DETAILED DESCRIPTION OF THE INVENTION

Hereinafter, embodiments of the data processors of the present invention will be described with reference to the accompanying drawings.

Embodiment 1

Figure 1:
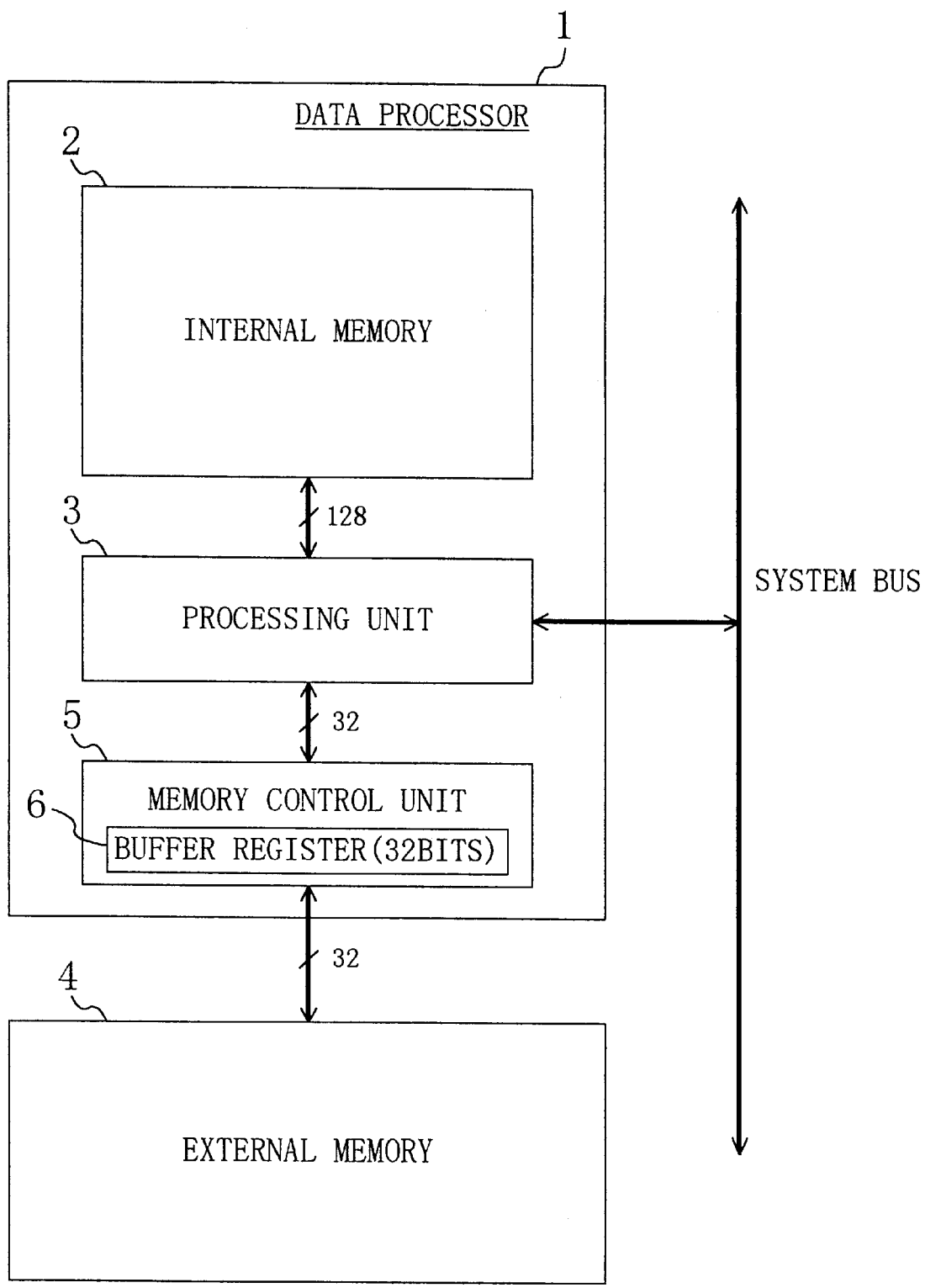
FIG. 1 is a block diagram showing a data processor in the first embodiment of the present invention.

FIG. 1 shows a data processor 1. The data processor 1 includes an internal memory 2 and a processing unit 3 on a single chip. The processing unit 3 carries out specified data processing operations while performing read/write operations on data in the internal memory 2. The internal memory 2 is a DRAM having a capacity on the order of megabytes. The processing unit 3 is provided with an I/O port coupled to a system bus. Based on the results of processing operations such as analytical and arithmetic operations performed on data and instructions in the internal memory 2, the processing unit 3 controls peripheral devices (not shown) through the system bus. The processing unit 3 has an access port for accessing an external memory 4. The processing unit 3 is coupled, through the access port, to a memory control unit 5 for performing data read/write operations on the external memory 4. The access to the external memory 4 by the memory control unit 5 is controlled by the processing unit 3. The processing unit 3 regards the internal and external memories 2 and 4 as a memory system.

The data processor 1 functions as a so-called CPU (central processing unit) and operates as follows. Address regions allocated to the internal and external memories 2 and 4 are supposed to be determined in a memory map on the system. Program data to be loaded to the internal and external memories 2 and 4 are specified such that instructions and data, which require many execution cycles and are frequently accessed, may be mapped to the internal memory 2. In a set of instructions executable by the processing unit 3, an instruction to exchange data between the internal and external memories 2 and 4 is prepared. When the processing unit 3 receives the exchange instruction and associated address region designations of the internal and external memories 2 and 4 and then executes the exchange instruction, data in the designated address regions are exchanged between the internal and external memories 2 and 4. Thus, if a programmer appropriately uses such an exchange instruction for programs and timely maps instructions and data, which require many execution cycles and are frequently accessed, to the internal memory 2, data analytical and arithmetic operations can be performed at a high speed. As a result, the overall program execution rate (performance) can be improved.

Data exchange is carried out in the following sequence. First, when the processing unit 3 receives an exchange instruction, the memory control unit 5 is activated. A part of the data, which is stored in a memory region of the external memory 4 and has been specified by the exchange instruction, is stored in a buffer register 6 of the memory control unit 5 in the form of 32-bit data. Next, the memory control unit 5 obtains a part of the data stored in a specified memory region of the internal memory 2 and then direct writes the data into the read memory region of the external memory 4. Although at this time the data output from the internal memory 2 is composed of 128 bits, only required data of 32 bits is output by the processing unit 3 to the memory control unit 5. The 32-bit data stored in the register 6 is written into the read memory region of the internal memory 2 and then data is partially exchanged. At this time, writing into the internal memory 2 from the processing unit 3 is performed with 32 bits only, and write masking is applied to the remaining 96 data bits. A series of such basic operations are repeatedly performed over all the designated memory regions, thereby exchanging data of the designated memory regions between the internal and external memories 2 and 4.

Data exchange operations have been described while assuming that the register 6 has a storage capacity smaller than that of a designated memory region. If data is exchanged between memory regions having a storage capacity smaller than that of the register 6, then the data exchange is completed by performing a single series of basic operations.

Figure 2:
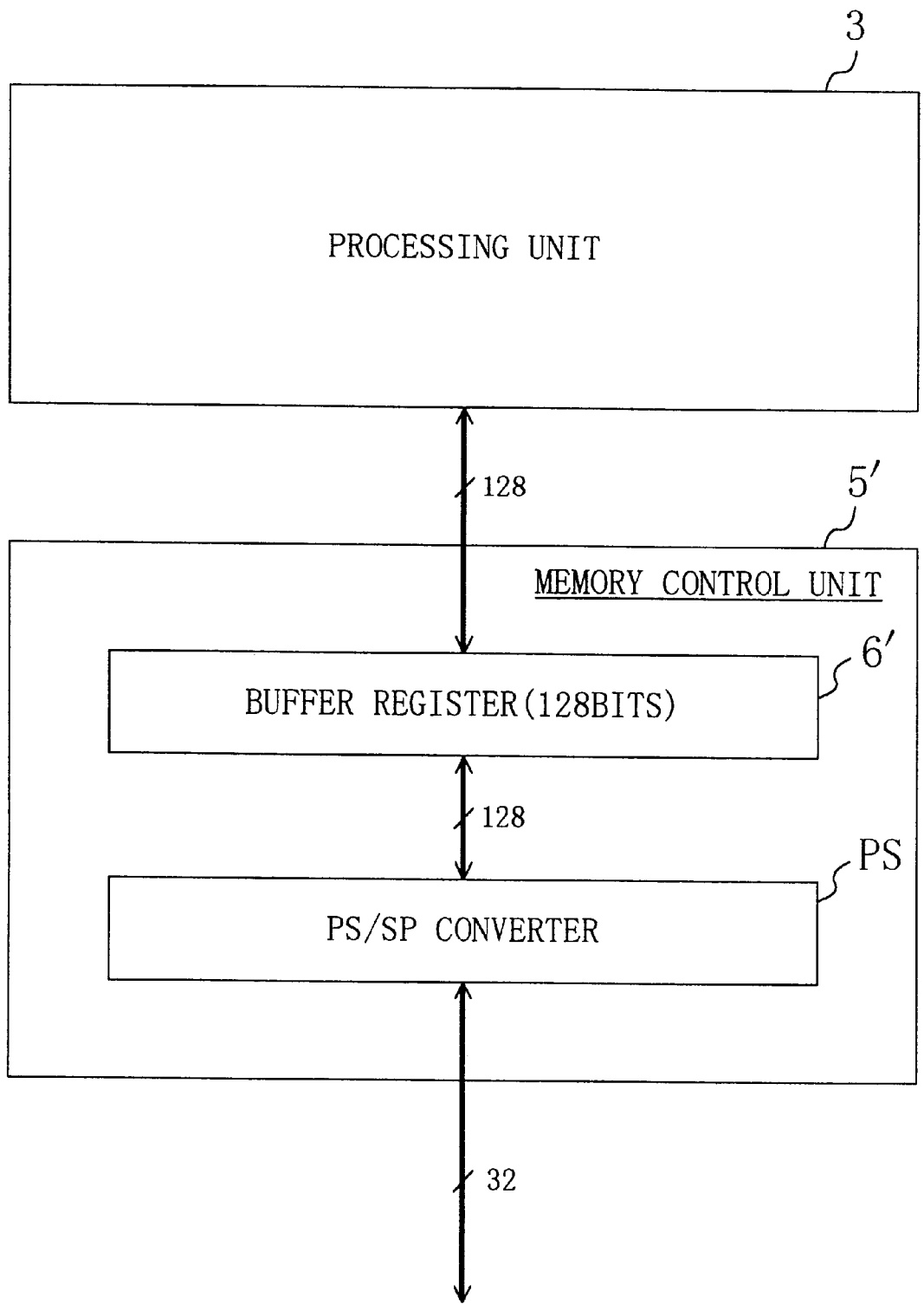
FIG. 2 is a block diagram showing a modified internal structure of a memory control unit of FIG. 1.

FIG. 2 shows a modified internal structure of the memory control unit 5 of FIG. 1, i.e., a memory control unit 5'. The memory control unit 5' includes: a buffer register 6' of 128 bits; and a PS/SP (parallel-to-serial/serial-to-parallel) converter circuit PS disposed between the register 6' and the 32-bit data bus of the external memory 4. Similar to the data bus provided between the internal memory 2 and the processing unit 3, a 128-bit data bus is provided between the memory control unit 5' and the processing unit 3. In the case of transferring data from the internal memory 2 to the external memory 4, data of 128 bits is stored in the register 6' through this data bus. This 128-bit data in the register 6' is divided, on the time axis, by the PS/SP converter circuit PS into 32-bit sub-data items in four cycles and then output to the data bus coupled to the external memory 4. On the other hand, in the case of transferring data from the external memory 4 to the internal memory 2, the PS/SP converter circuit PS sequentially writes the 32-bit sub-data items from the external memory 4 into the register 6' for each of the four cycles. And when data of 128 bits is accumulated in the register 6', the register 6' outputs all of them to the processing unit 3 at a time.

As described above, the memory control unit 5' is provided with the PS/SP converter circuit PS in this modification. Thus, in such an arrangement, the width of the data bus between the processing unit 3 and the memory control unit 5' may be equal to the width of the data bus between the processing unit 3 and the internal memory 2. Accordingly, the processing unit 3 need not carry out alignment operations, e.g., write masking, due to a difference in data bus widths. As a result, the data processing efficiency of the processing unit 3 can be increased. In addition, since a data bus having an equal width can be used in common between the processing unit 3 and the internal memory 2 and between the processing unit 3 and the memory control unit 5', the layout area can be reduced, thereby reducing the production cost.

Figure 3:
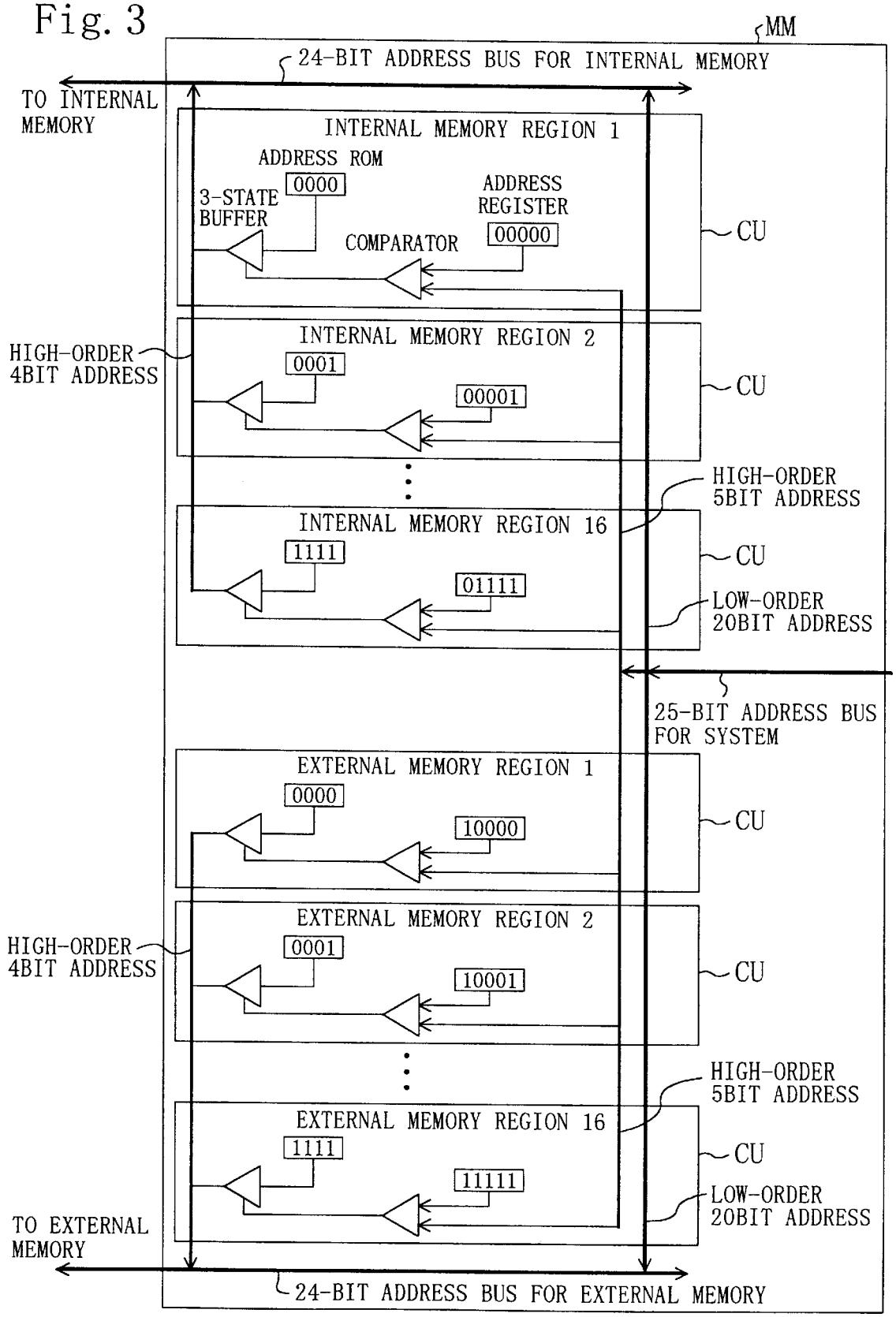
FIG. 3 is a block diagram showing a memory address manager in a processing unit.

In the data processor of the present invention, data exchange is carried out between the internal and external memories 2 and 4. However, once data has been exchanged, address allocations of the memories should also be exchanged. FIG. 3 shows an example of such address allocation exchange. FIG. 3 shows a memory address manager MM provided for the processing unit 3. This manager MM has the ability of exchanging addresses with respect to a memory region on one megabyte basis in a 32-megabyte (25-bit) memory space including 16 megabytes of the internal memory 2 and 16 megabytes of the external memory 4. First, when a system address of 25 bits is received from, for example, a CPU, the memory address manager MM divides the received system address into low-order 20 bits indicative of a memory address in a 1-megabyte memory region and high-order 5 bits indicative of any one of the 32 memory regions of the internal and external memories 2 and 4. The low-order 20-bit address is provided as it is to the internal memory 2 and the external memory 4. The high-order 5-bit address is any one of 00000 to 11111 in binary notation. Thirty-two compare units CU, which are disposed correspondingly to the memory regions #1–#16 of the internal memory 2 and the memory regions #1–#16 of the external memory 4, determine which of the 32 memory regions was accessed with the aid of address registers and comparators. Then, the compare units CU provide a high-order 4-bit address corresponding to the accessed region from a corresponding address ROM (read only memory) through a corresponding 3-state buffer to the internal memory 2 or to the external memory 4. Each address register shows a respective memory region number (corresponding to a 5-bit address). On the other hand, each address ROM represents a respective fixed address of four bits inherent to a respective memory region. An address of 24 bits is given for each memory 2 and 4 and each memory space of 16 megabytes is accessed.

Herein, suppose that a data exchange was carried out between the internal memory region #2 and the external memory region #16 in FIG. 3. Then, the values of address registers of the compare units CU of these memory regions are re-written. That is to say, the values of the address registers of the memory regions are exchanged.

In the data processor of the present invention, memory allocations are also exchanged during the data exchange. Stated another way, it is probable that a storage region where data corresponding to a certain address is stored changes physically, because of the data exchange between the internal and external memories 2 and 4. Thus, it is possible to form a memory space without causing data overlapping between the internal and external memories 2 and 4.

Figure 4:
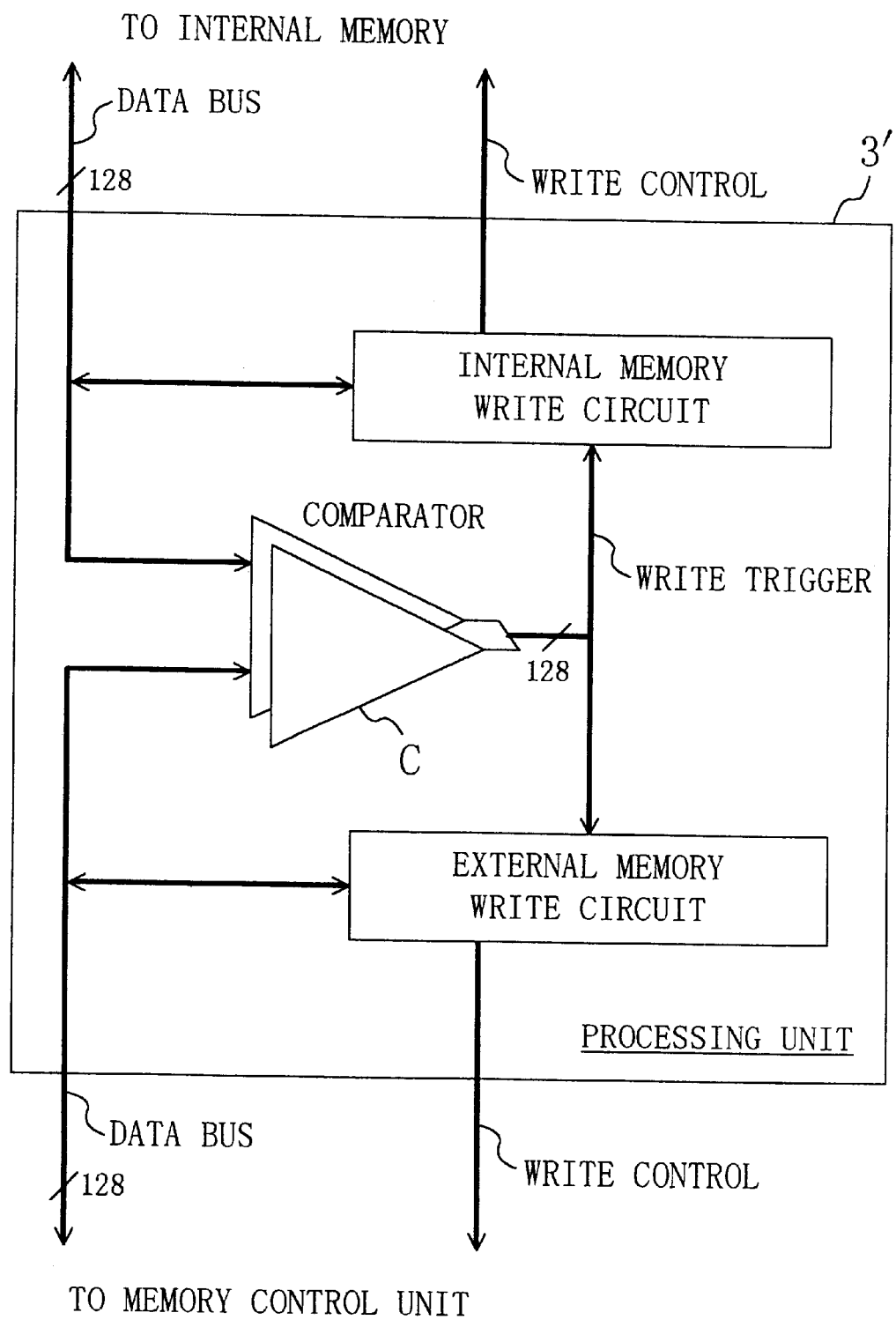
FIG. 4 is a block diagram showing an exemplary internal structure of the processing unit of FIG. 2.

FIG. 4 shows an example of the internal structure of the processing unit of FIG. 2. A processing unit 3' includes a comparator C for comparing data provided from the internal memory 2 with data provided from the external memory 4 bit by bit. If the data read out from the internal memory 2 and the data read out from the external memory 4 are different from each other, then the comparator C activates a write trigger signal to an internal memory write circuit and to an external memory write circuit. As a result, data inverse of the data read out from the internal and external memories 2 and 4 are written into the internal and external memories 2 and 4 while keeping the outputs of the memories 2 and 4 at high impedance during read modify write cycles. On the other hand, if the comparator C indicates a complete agreement between the data read out from the internal memory 2 and the data read out from the external memory 4 (which means that the data to be exchanged are identical to each other), neither the internal memory 2 nor the external memory 4 is subjected to write processing. Each write circuit provides a write control signal for read modification necessary for memory write operations. If the comparator C indicates a partial agreement, then read modify write cycles are executed with the matching bits write masked. By providing the comparator C for the processing unit 3', several advantages can be attained. For example, if data to be exchanged completely agree with each other, write cycles are not started, thereby reducing the total number of cycles required for data exchange. In addition, both time and processing load required for data exchanges are reduced, resulting in the improvement of the overall performance. It is noted that the comparator C and the write circuits may be provided for the memory control unit 5'.

Figure 5:
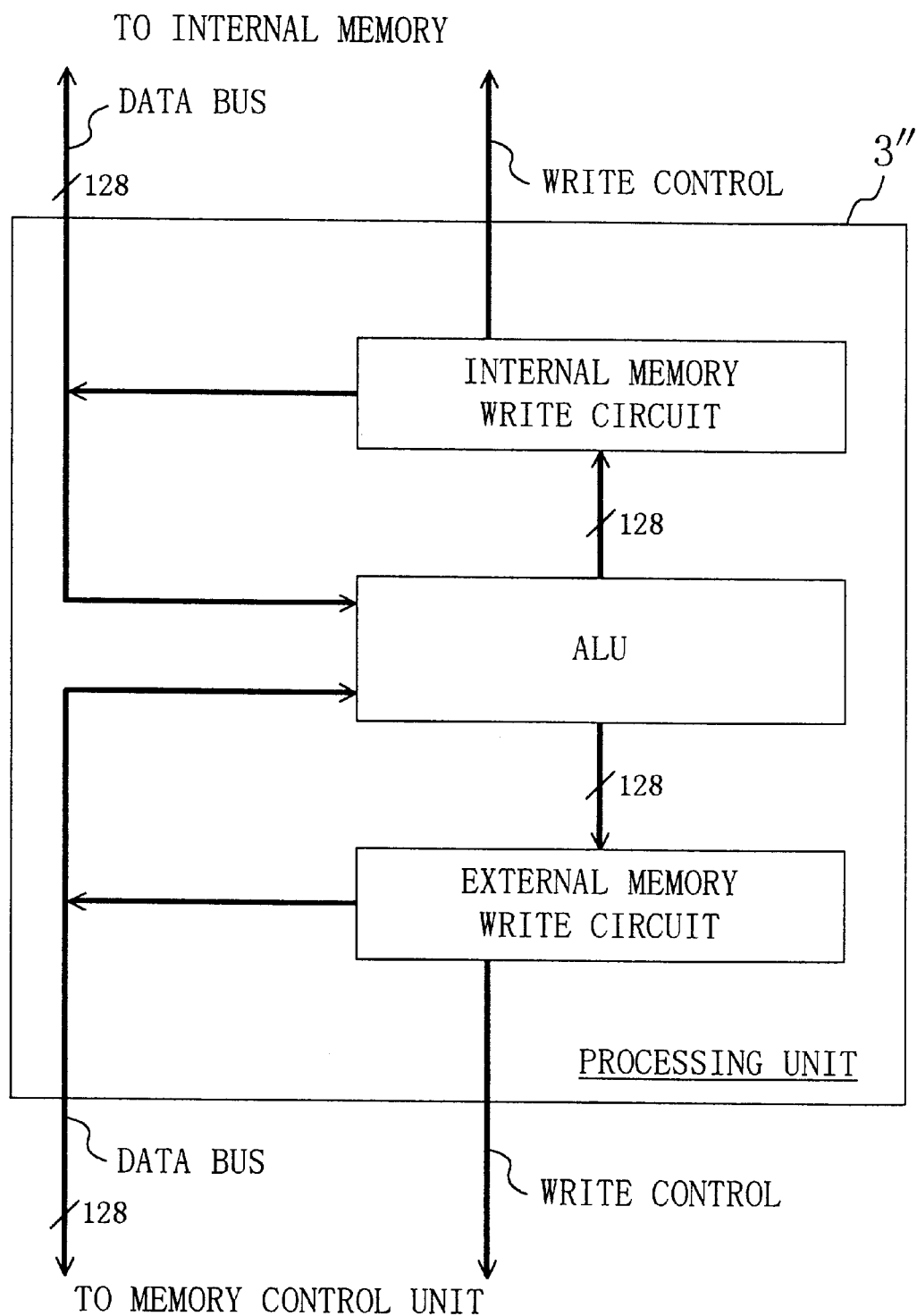
FIG. 5 is a block diagram showing another exemplary internal structure of the processing unit of FIG. 2.

FIG. 5 shows another example of the internal structure of the processing unit shown in FIG. 2. A processing unit 3", including an arithmetic circuit ALU operable to perform arithmetic operations on data from the internal and external memories 2 and 4, is shown. The processing unit 3" makes the arithmetic circuit ALU perform specified arithmetic operations on data from each memory 2 and 4 bit by bit. The arithmetic results are supplied to internal and external memory write circuits. The memory write circuits provide the arithmetic results to the internal and external memories 2 and 4. Writing to the internal and external memories 2 and 4 is carried out during read modify write cycles as in the case of FIG. 4. In this embodiment, it is possible to perform arithmetic operations on data during the data exchange. Thus, if the data processor of the present invention is applied to an MPEG encoding LSI and respectively different I/B/P pictures are stored in an internal memory and in an external memory, it is possible to perform inter-picture data arithmetic operations during the data exchange between the internal and external memories. As a result, post-arithmetic picture data can be stored in at least one of the memories during the data exchange and higher-performance data processing is realized.

Embodiment 2

Figure 6:
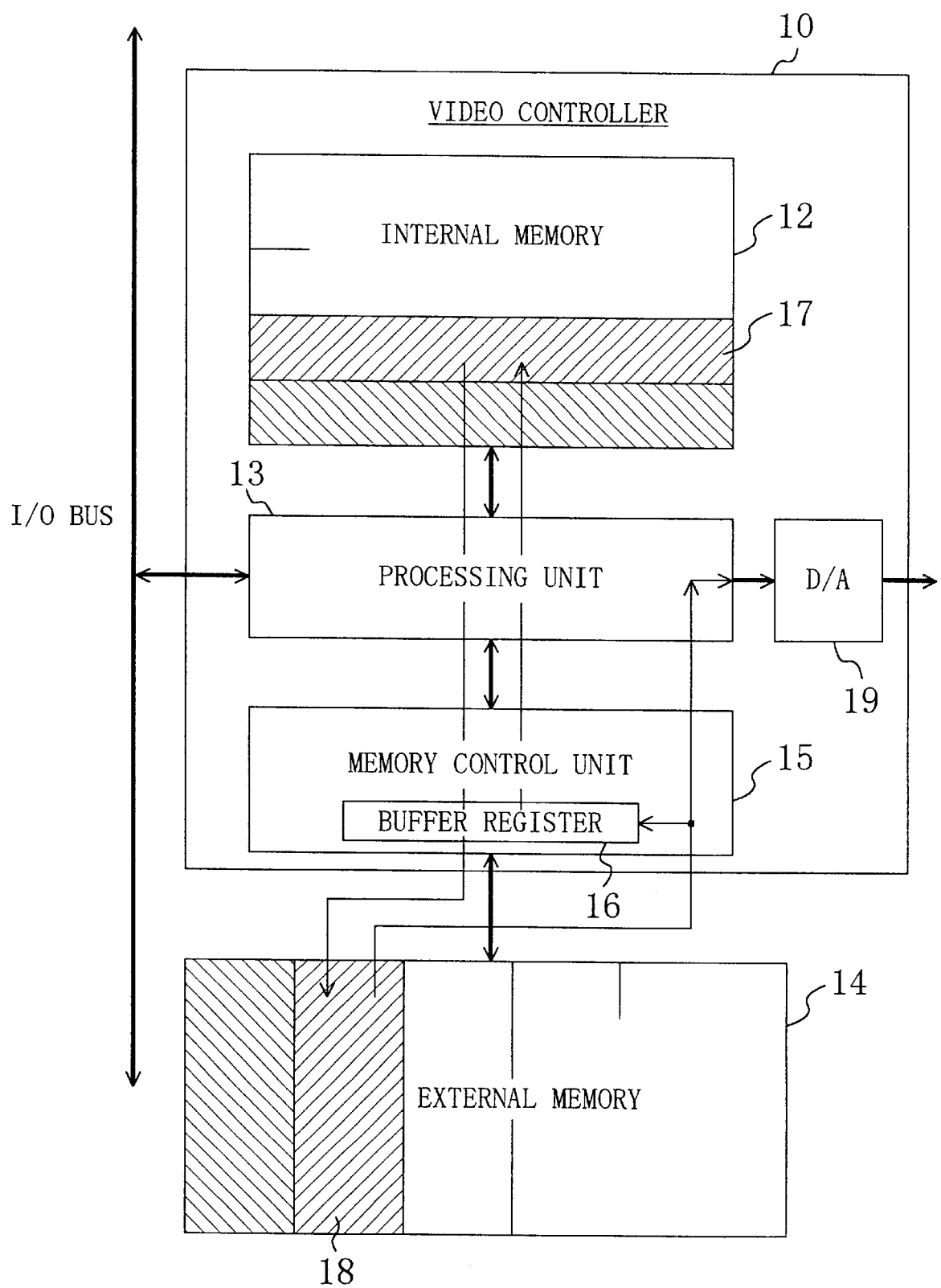
FIG. 6 is a block diagram showing a data processor in the second embodiment of the present invention.

FIG. 6 shows an exemplary video controller, to which the data processor of the present invention is applied. The video controller 10 uses an internal memory 12 and an external memory 14 as frame buffers. These memories 12 and 14 are mapped to a memory space of series addresses and video data onto the monitor are stored in the memories 12 and 14. The memories 12 and 14 are divided into memory regions 17 and 18, respectively, and the memory regions 17 and 18 are respectively specified by addresses supplied to the memories 12 and 14. A processing unit 13 stores the memory address of the boundary between the low and high limits of each memory region 17 and 18. Thus, the processing unit 13 can decide which of the memory regions 17 and 18 of the memories 12 and 14 is being read or written. The processing unit 13 communicates with a core system such as a CPU (not shown) through an I/O (input/output) bus, thereby receiving commands therefrom. The processing unit 13 receives and analyzes a command, accesses each memory 12 and 14 in compliance with the command, and processes video data stored in the memories 12 and 14. A memory control unit 15 is activated for accessing the external memory 14. Video data stored in the memories 12 and 14 are timely output through a D/A converter 19 so as to be displayed as video on a monitor (not shown).

In the same way as in the first embodiment, data is exchanged between the internal and external memories 12 and 14 in the video controller 10. As described below, such data exchange is carried out with respect to the memory region based on how many times the memories 12 and 14 have been accessed. The processing unit 13 makes reference to a memory address to be accessed, thereby recognizing in succession which of the memory regions of the memories 12 and 14 was accessed. Next, the processing unit 13 obtains a memory region 17 in the internal memory 12 that has been accessed the smallest number of times and how many times the memory region 17 has been accessed, and also obtains a memory region 18 in the external memory 14 that has been accessed the largest number of times and how many times the memory region 18 has been accessed during respectively predetermined time periods. Then, the processing unit 13 stores these values in a register (not shown) in the processing unit 13. Then, the processing unit 13 makes reference to the values in the register. If the memory region 18 of the external memory 14 is found to have been accessed more frequently than the memory region 17 of the internal memory 12, then the processing unit 13 controls the memory control unit 15, thereby exchanging the data stored in the memory regions 17 and 18. During the data exchange, a buffer register 16 of the memory control unit 15 is used as a data save storage, as in the first embodiment. That is to say, all data stored in the memory regions 17 and 18 are exchanged while partially saving data in the register 16.

The timing of data exchange will be explained with reference to FIG. 6. While the data stored in a memory region 18 of the external memory 14 that is an object of exchange is being output through the D/A converter 19, the output data is sequentially copied to the buffer register 16 and data stored in a memory region 17 of the internal memory 12 that is another object of data exchange is simultaneously written into the memory region 18 of the external memory 14 during read modify write cycles. The data stored in the buffer register 16 is then written into the memory region 17 of the internal memory 12. This makes it possible to exchange data efficiently, while reducing the overhead necessary for data exchange as much as possible. In such a case, if the buffer register 16 has a storage capacity large enough to store the entire memory region that is an object of data exchange, then data can be advantageously exchanged very fast and smooth. In this embodiment, data is exchanged during the output period of data from the external memory 14. However, data may be exchanged during the output period of data from the internal memory 12. A period of monitor blanking (not shown) may be used for exchange timing.

As described above, in the video controller 10, a frequently accessed memory region is mapped to the internal memory 12. Thus, when a window is opened on the monitor for reproduction of video moving pictures therein, a memory region corresponding to the window is mapped to the internal memory 12. As a result, very smooth moving picture reproduction is realized. When moving pictures are reproduced, other video processing operations are seldom performed in general. Thus, even when all video data other than data for a window for moving picture reproduction are stored in the external memory 14, no serious problems result from the access speed of the external memory 14. To sum up, the present video controller 10 (as a data processor) utilizes the time locality of processing data, thereby timely exchanging data between the internal and external memories 12 and 14. As a result, the overall data processing performance can be improved.

Embodiment 3

Figure 7:
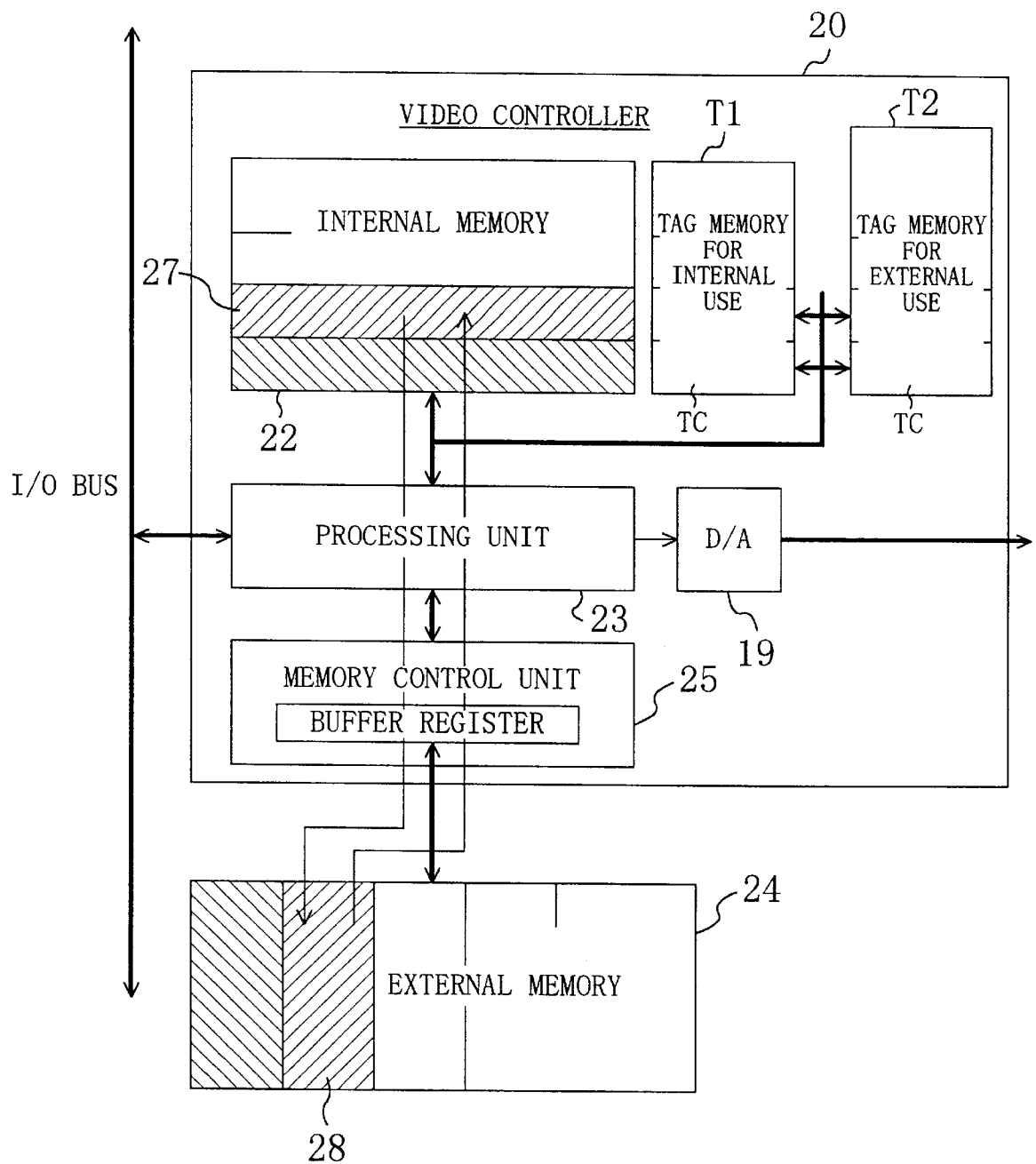
FIG. 7 is a block diagram showing a data processor in the third embodiment of the present invention.

A video controller 20 shown in FIG. 7 includes tag memories T1 and T2 for memory regions of internal and external memories 22 and 24, respectively. The tag memories T1 and T2 store how many times the memories 22 and 24 have been accessed, respectively. A processing unit 23 makes the tag memories T1 and T2 store how many times each memory region has been accessed. Thus, unlike the second embodiment, it is possible to know the number of times of access to the memory regions. As a result, memory region can be exchanged with higher precision.

Figure 8:
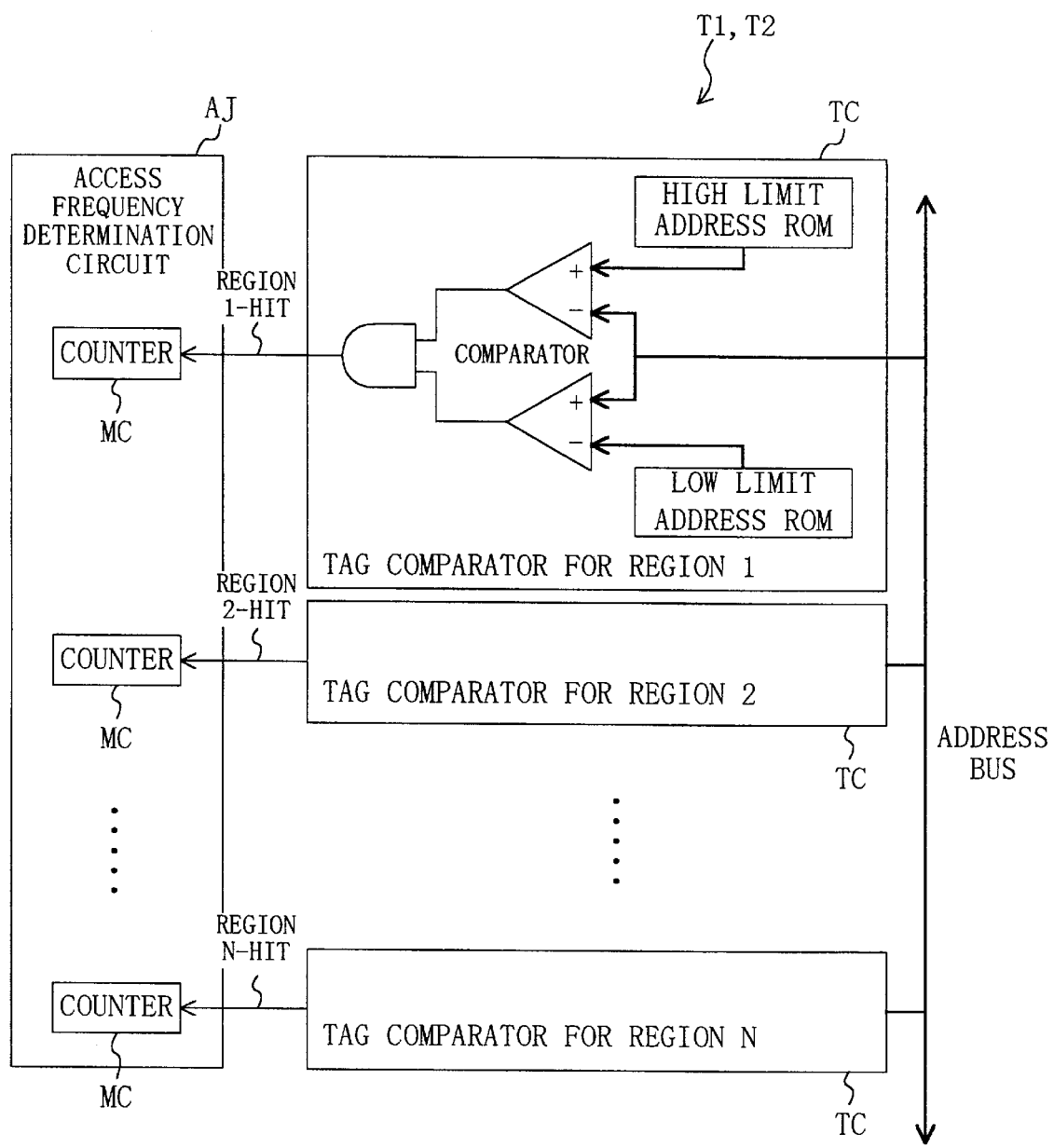
FIG. 8 is a block diagram of a tag memory.

Referring now to FIG. 8, each tag memory T1 and T2 is divided into N sections (section 1, section 2, ..., section N) corresponding to N memory regions and includes N tag comparators TC and an access frequency determination (judgement) circuit AJ. Each tag comparator TC of the tag memory T1 (T2) has a comparator, which makes reference to a memory address from the processing unit 23 to determine whether the memory address is intended for the memory region 27 (the memory region 28), i.e., the memory region, of which the comparator is in charge, as shown in FIG. 7. The circuit AJ has N memory counters MC. Each memory counter MC is incremented whenever a corresponding tag comparator TC determines that the memory address is intended for the memory region 27 (the memory region 28), i.e., the memory region, of which the comparator is in charge. Each tag comparator TC stores low and high limit addresses of a corresponding memory region in respective address ROMs, and sends out a count-up signal to a corresponding memory counter MC if a memory address from the processing unit 23 is included between the low and high limit addresses and if the internal and external memories 22 and 24 are read or written. In response to the count-up signal, the memory counter MC of the circuit AJ is incremented, thereby storing the number of times of access to a memory region, of which the counter is in charge. The value of each memory counter MC is reset when a data exchange is carried out. Making reference to the values of the memory counters MC of the memory regions at predetermined time intervals, the circuit AJ directs the processing unit 23 to exchange data between the internal and external memories 22 and 24 such that a frequently accessed memory region may be mapped to the internal memory 22. The processing unit 23 then exchanges data between the internal and external memories 22 and 24 in compliance with the direction of the respective circuits AJ of the tag memories T1 and T2. As described above, data may be exchanged when data are output through the D/A converter 19 or a period of monitor blanking.

This video controller (data processor) 20 differs from the embodiment of FIG. 6, in which data is exchanged between the most frequently accessed memory region of the external memory and the least frequently accessed memory region of the internal memory. In the video controller 20, however, the tag memories T1 and T2 for storing the number of times of access to each memory region are provided, thereby mapping all of frequently accessed memory regions to the internal memory 22 and the processing unit 23 is no longer required to specify a memory region for every access to store the number of times of access to the specified memory region. Thus, the load of the processing unit 23 is lightened. As a result, the processing unit 23 can concentrate on originally intended data processing, thereby improving the overall data processing performance.

Embodiment 4

Figure 9:
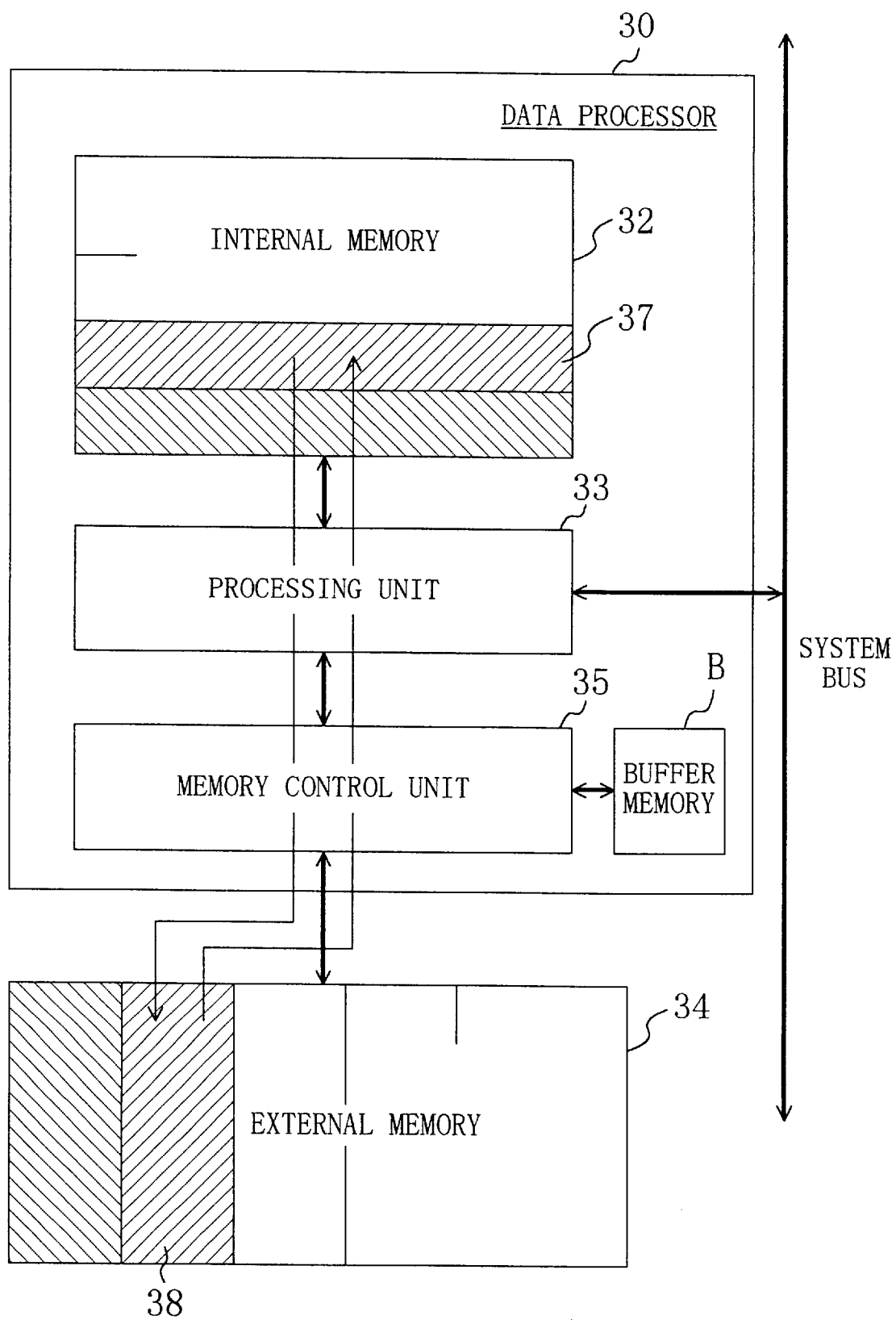
FIG. 9 is a block diagram showing a data processor including a buffer memory in the fourth embodiment of the present invention.

FIG. 9 shows another embodiment of the present invention, in which the data processor of the present invention serves as a so-called CPU. This data processor 30 includes internal and external memories 32 and 34 that are divided into memory regions 37 and 38 having a specified storage capacity, as in the foregoing second and third embodiments, and data is exchanged on the basis of the memory regions (the memory regions 37 and 38). A memory control unit 35 includes, instead of the above-described buffer register, a buffer memory B having a storage capacity equal to or larger than that of the memory regions 37 and 38. This buffer memory B is a static random access memory (SRAM) or a DRAM and performs data write/read operations under the control of the memory control unit 35. When a processing unit 33 instructs data exchange, the memory control unit 35 temporarily saves, at a time, data in one of the memory regions 37 and 38 in question in the buffer memory B during burst cycles. Thereafter, data in the other memory region in question is written into the former memory region whose data was saved in the buffer memory B, during burst cycles. Subsequently, the data stored in the buffer memory B is written into the latter memory region during burst cycles at a time, thereby completing the intended data exchange. The data processor 30 is provided with the buffer memory B having a storage capacity equal to or larger than that of the memory regions 37 and 38. Thus, not only time and processing load required for exchanging data are considerably reduced, but also the overall data processing performance is improved.

Figure 10:
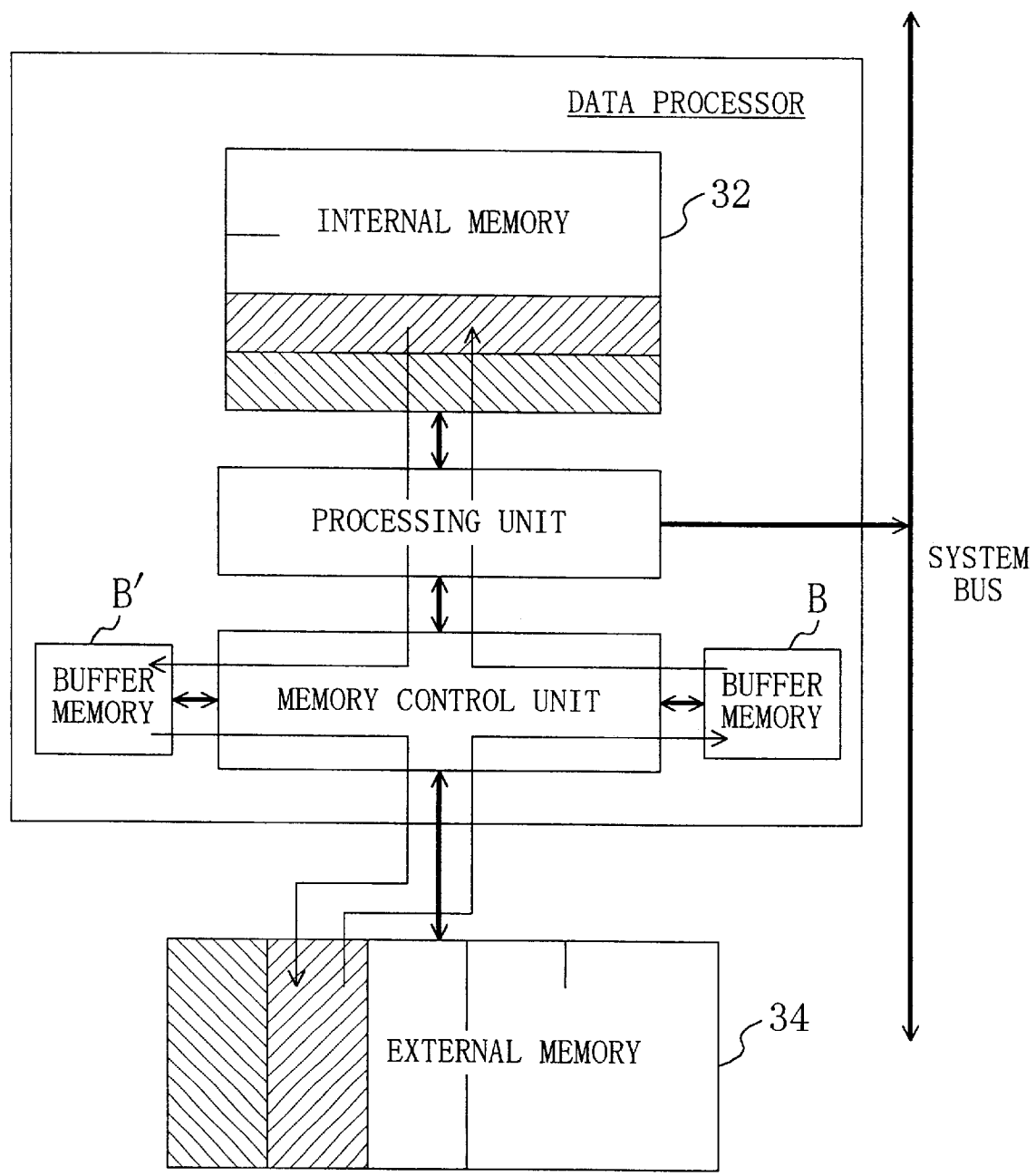
FIG. 10 is a block diagram showing a data processor additionally including another buffer memory.

If another buffer memory B' is provided as shown in FIG. 10, then it is possible to simultaneously start read access to the memory 32 and to the memory 34, store the obtained data in the buffer memory B and in the buffer memory B', respectively, and simultaneously write the data in the buffer memories B and Be into the memory 34 and into the memory 32, respectively. Thus, time and processing load required for exchanging data can be reduced, thereby improving the overall data processing performance.

Embodiment 5

Figure 11:
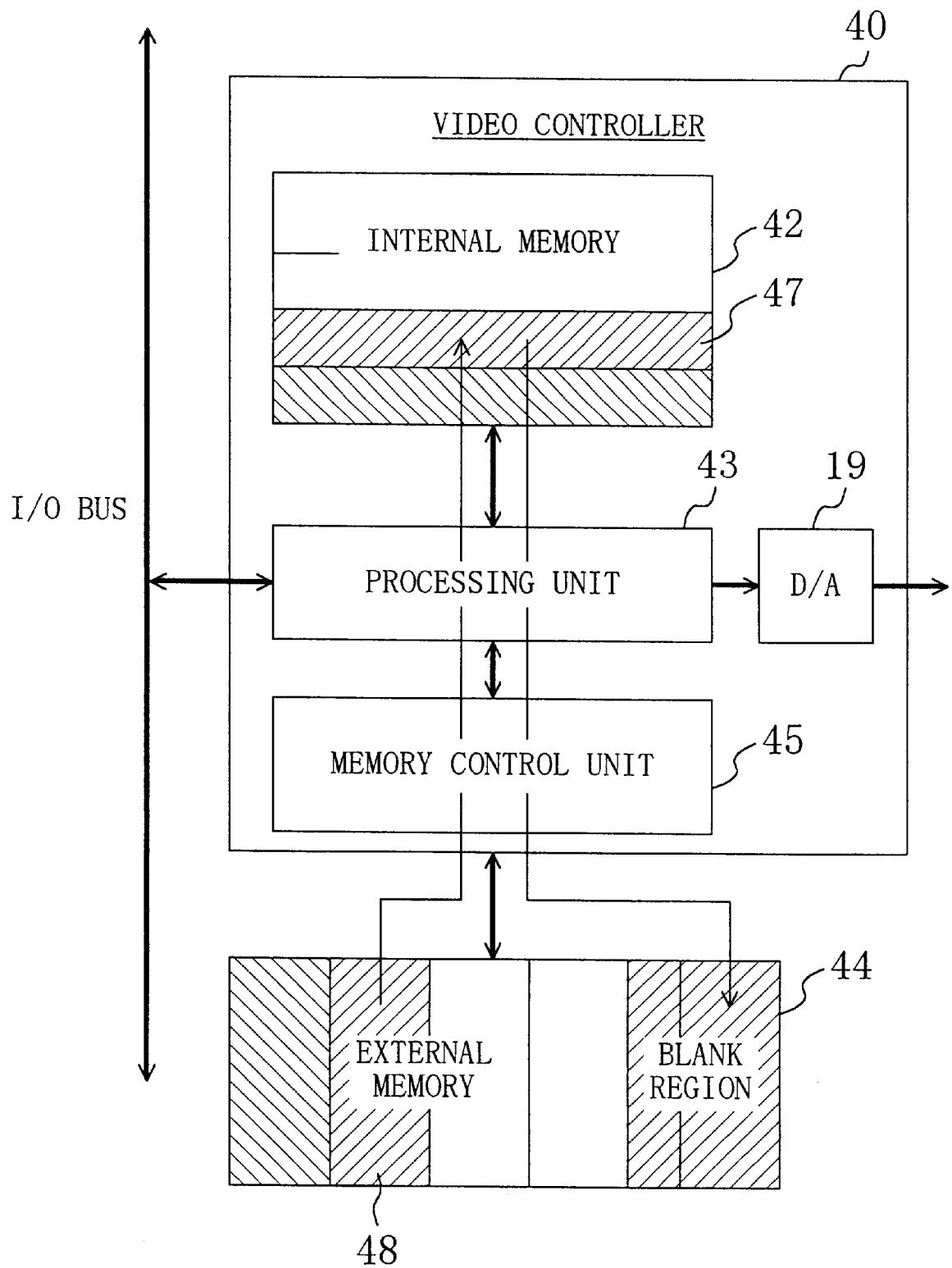
FIG. 11 is a block diagram showing a data processor in the fifth embodiment of the present invention.

FIG. 11 shows another example of the present invention, in which the data processor of the present invention serves as a video controller. This video controller 40 utilizes a blank memory region of an external memory 44 for exchanging data with respect to memory regions 47 and 48 between an internal memory 42 and the external memory 44. For example, if the monitor screen size is 1024 by 768 pixels with 24-bit color per pixel when the internal and external memories 42 and 44 are implemented by an 8-megabit DRAM and by a 16-megabit DRAM, respectively, then a storage capacity of 18.5 megabits is required as the storage capacity of a frame buffer. This will leave a blank memory region of 5.5 mega-bits in the external memory 44. Such a blank memory region can be used as a data save buffer memory for data exchange.

Figure 12:
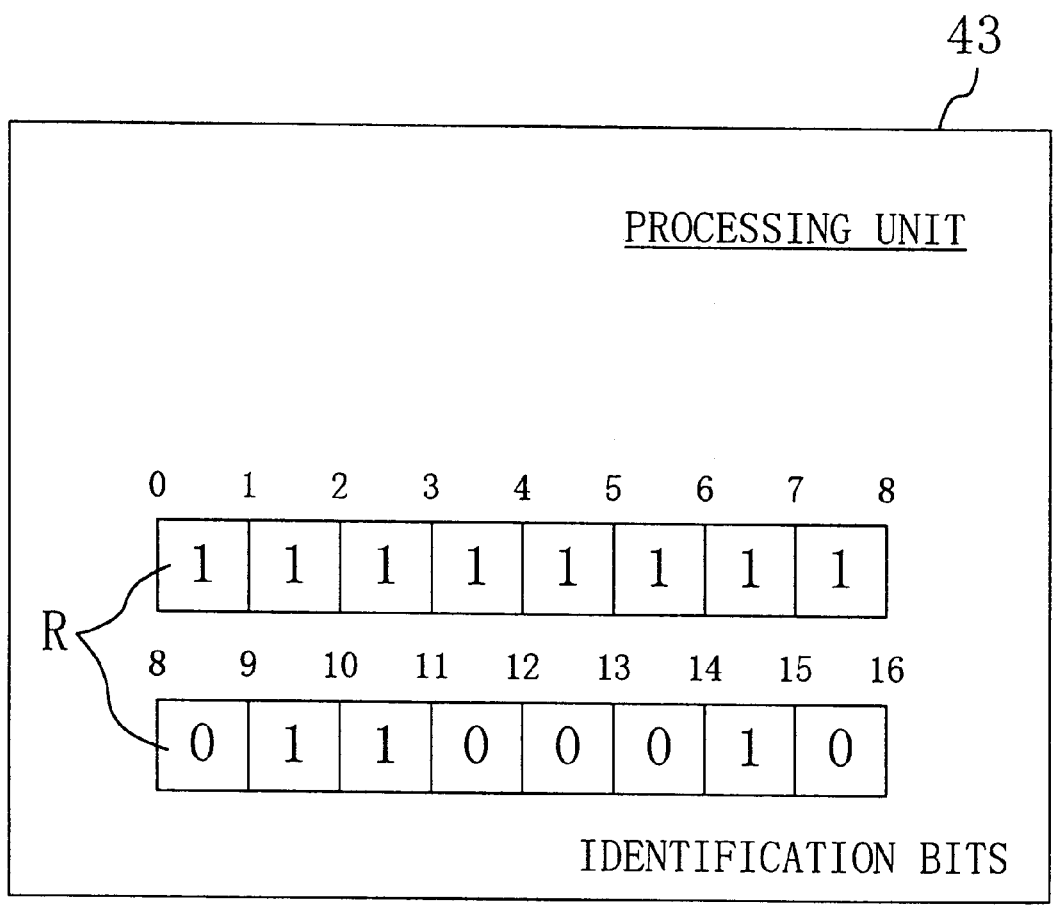
FIG. 12 is a block diagram showing identification bits.

As shown in FIG. 12, a processing unit 43 is provided with identification bits R corresponding to respective memory regions 48 in the external memory 44. By referring to the identification bits R, the processing unit 43 recognizes all the blank memory regions in the external memory 44 as follows. For example, if the storage capacity of each memory region is set at one megabit, then the number of identification bits R is sixteen since the external memory 44 is a 16-megabit DRAM. The memory regions in the external memory 44 in series correspond to these 16 identification bits R, respectively. If an identification bit R is '1', then data is stored in a corresponding memory region 48. On the other hand, if an identification bit R is '0', this indicates that a corresponding memory region 48 is blank. The identification bits R are referred to by the processing unit 43 and are rewritten during the data exchange. In FIG. 12, regions at 8–9, 11–14, and 15–16 mega memory addresses are blank.

In the video controller (data processor) 40, data in the memory regions 47 and 48 can be exchanged at a time during burst cycles, while making use of blank memory regions in the external memory 44. As a result, not only time and processing load required for exchanging data can be considerably reduced but also the overall data processing performance can be improved, though the reduction is to a lesser degree as compared with the fourth embodiment. In addition, unlike the foregoing embodiments, there is no need for providing a buffer register or a buffer memory, thereby reducing costs and much increasing the commercial value thereof. Moreover, since the blank memory regions of the external memory 44 can be identified by making reference to the identification bits R, the processing unit 43 need not store the address of blank memory regions. As a result, the processing unit 43 can concentrate on data processing, thereby improving performance.

Embodiment 6

Figure 13:
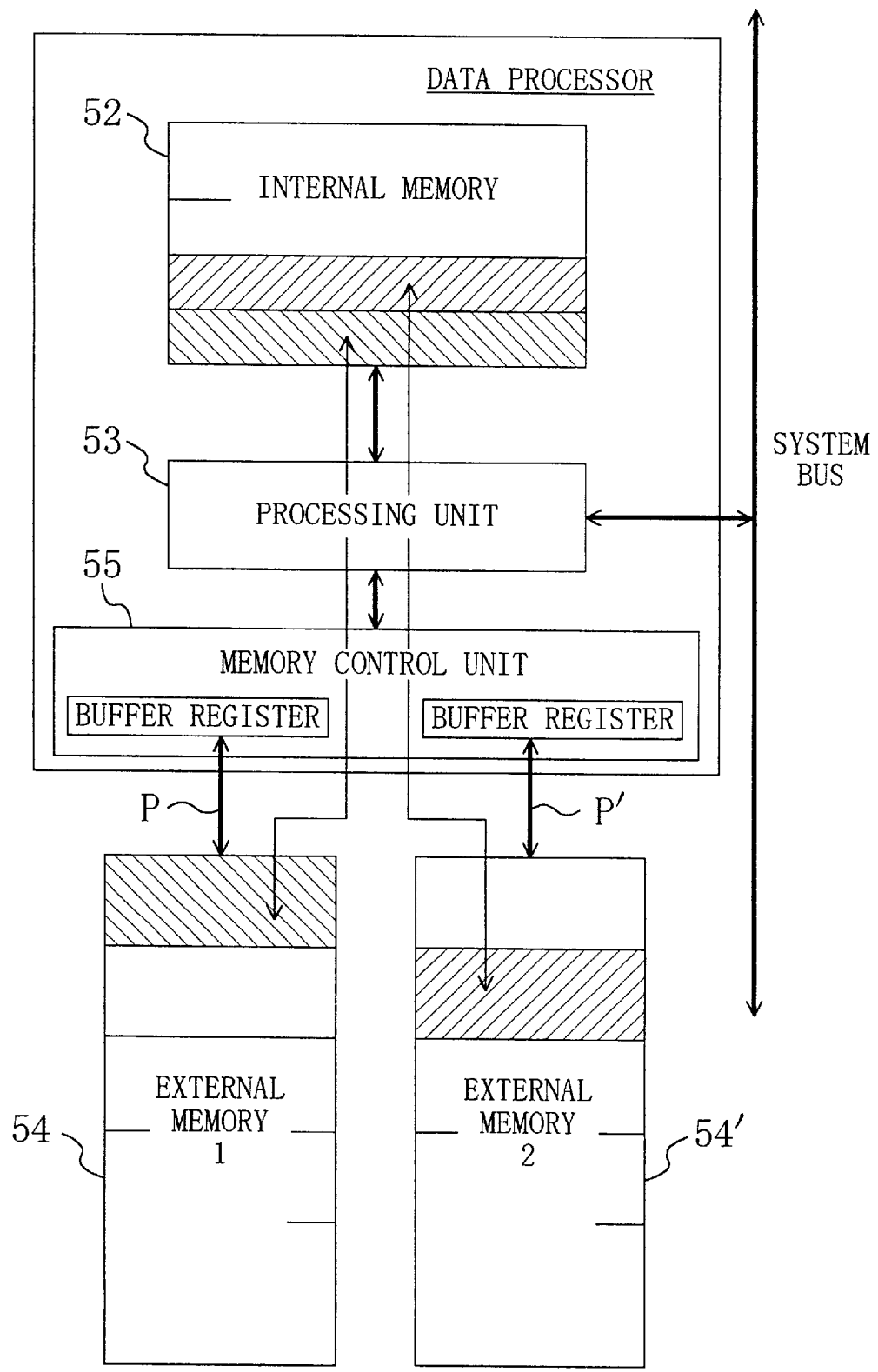
FIG. 13 a block diagram showing a data processor in the sixth embodiment of the present invention.

In a data processor 50 of FIG. 13, a memory control unit 55 includes external memory access ports P and P'. External memories 54 and 54' are coupled to the access ports P and P', respectively. A processing unit 53 exchanges data with respect to memory regions between the external memories 54 and 54' and an internal memory 52.

In this embodiment, data is exchanged between the external memories 54 and 54' and the internal memory 52 through the access ports P and P'. In such an arrangement, the over-all memory system performance can be improved by mapping data requiring high-speed processing and specific data frequently accessed in a large memory system, to the internal memory 52.

FIRST EXAMPLE OF DATA PROCESSING SYSTEM

Figure 14:
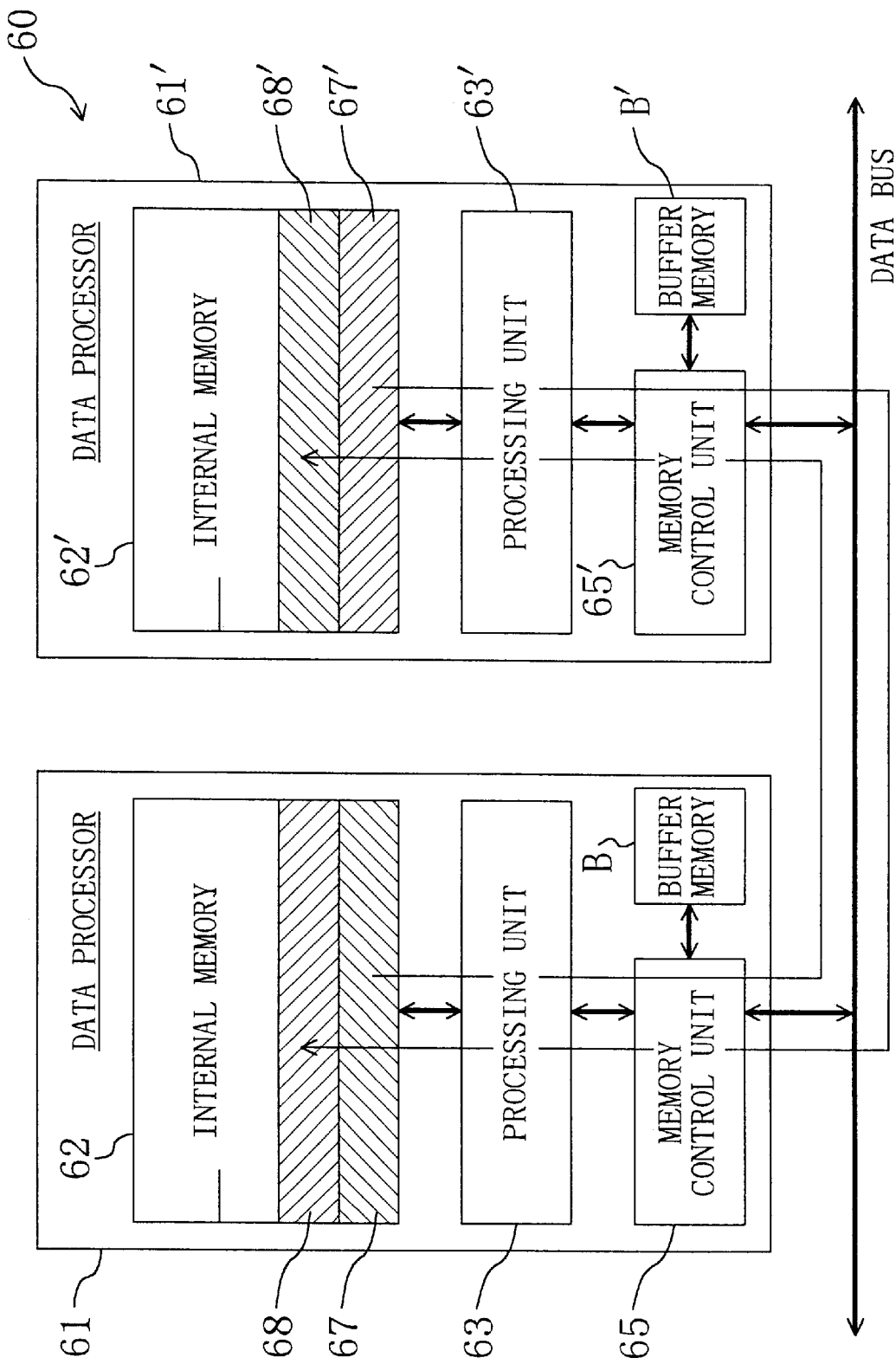
FIG. 14 is a block diagram of a first data processing system of the present invention.

FIG. 14 shows a data processing system 60 constructed by connecting together data processors 61 and 61' via a data bus. The data processors 61 and 61' implement so-called parallel processing, in other words, processing units 63 and 63' use the respective internal memories 62 and 62' for performing data processing independent of each other.

A series of memory addresses are assigned to the internal memories 62 and 62' of the data processors 61 and 61'. The data processor 61 is able to access data stored in the internal memory 62' of the data processor 61' through memory control units 65 and 65 and the data bus. Additionally, a memory region 67' of the internal memory 62' storing a desired data can be exchanged with a less frequently accessed memory region 67 of the internal memory 62 in compliance with hardware's judgment or program designation, if it is highly possible that the desired data will be frequently accessed. The buffer memories B and B' are used for such data exchange.

In this data processing system 60, data in the memory regions 67 and 67' and data in the memory regions 68 and 68' of the internal memories 62 and 62' can be exchanged between the data processors 61 and 61'. In such an arrangement, demanded and frequently accessed data, such as result data that have undergone data processing by one data processor, can be mapped to an internal memory of another data processor. This makes it possible for the latter data processor to communicate data with the internal memory at a high speed, thereby increasing the data processing rate.

SECOND EXAMPLE OF DATA PROCESSING SYSTEM

Figure 15:
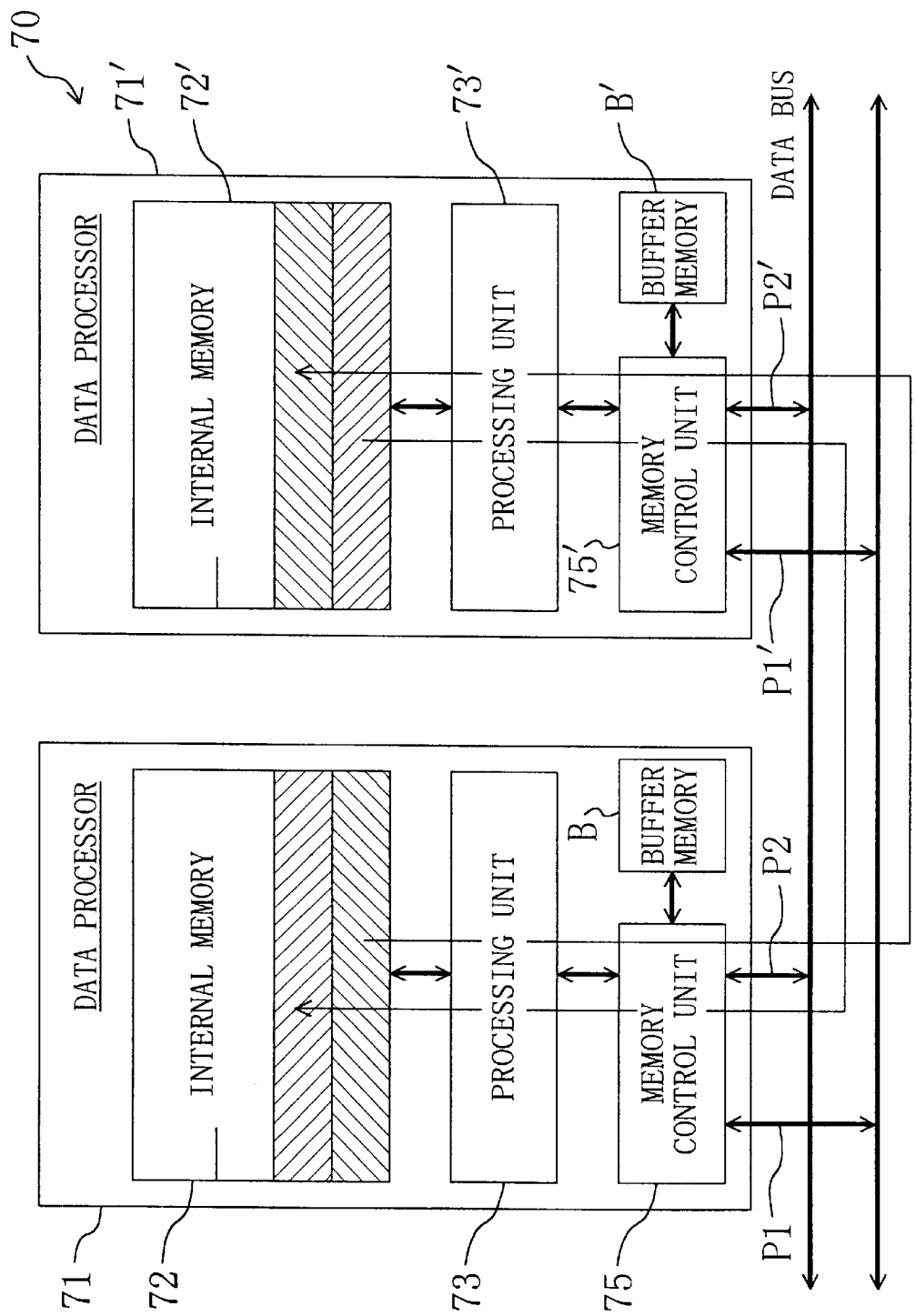
FIG. 15 is a block diagram of a second data processing system of the present invention.

FIG. 15 shows a data processing system 70 including data processors 71 and 71'. The data processor 71 includes a memory control unit 75 having two access ports P1 and P2, while the data processor 71' includes a memory control unit 75' having two access ports P1' and P2'. The data processors 71 and 71' are coupled together via these access ports P1, P2, P1' and P2'.

In the data processing system 70, the data processor 71 having the access ports P1 and P2 and the data processor 71' having the access ports P1' and P2' are coupled together via two data buses. Thus, by using these data buses, the memory control units 75 and 75' can simultaneously perform read and write operations on data in internal memories 72 and 72'. As a result, the time required for exchanging data can be reduced and the total performance can be improved.

What is claimed is:

1. A data processor, comprising:
   an internal memory; and
   a processing unit for performing specified data processing operations while performing read/write operations on said internal memory,
   wherein a memory control unit for performing read/write operations on an external memory and a buffer part for storing data from said internal memory or from said external memory are controllably coupled to said processing unit,
   wherein data from a first memory region of one of said internal memory or said external memory is temporarily stored in said buffer part, data from a second memory region of the other one of said internal memory or external memory is written into said first memory region, and data from said buffer part is written into said second memory region, thereby exchanging data between said internal memory and said external memory to form a specified memory space out of said internal memory and said external memory, such that no regions corresponding to the internal memory exist in the external memory,
   wherein said memory control unit or said processing unit is provided with a comparator for comparing a data item from said internal memory with another data item from said external memory, and
   wherein, if said comparator indicates that said data items are different from each other, the data items are written into said internal memory or into said external memory to exchange the data items between said internal memory and said external memory.

2. The data processor of claim 1, wherein said processing unit includes an address management part for controlling addresses of said internal and external memories,
   and wherein, when data exchange is performed between said internal memory and said external memory, exchanging address allocations corresponding to said data exchange is carried out by said address management part.

3. The data processor of claim 1, wherein said memory control unit is provided with an additional function of performing data conversion in parallel or in series between said internal memory and said external memory,
   and wherein said processing unit and said memory control unit are coupled together via a data bus having the same width as a width of a data bus between said internal memory and said processing unit.

4. The data processor of claim 1, wherein said memory control unit or said processing unit is provided with an arithmetic part for performing data arithmetic operations on the data from said internal and external memories.

5. The data processor of claim 1, wherein said data exchange is carried out with respect to a memory region having a specified storage capacity,
   and wherein data exchanges are carried out between said internal memory and said external memory in order that memory regions frequently accessed by said processing unit and memory regions infrequently accessed by said processing unit are located in said internal memory and in said external memory, respectively.

6. The data processor of claim 5, wherein said processing unit or said memory control unit is provided with tag memories, each said tag memory storing a value indicating how may times each said memory region of said internal memory or said external memory is accessed,
   and wherein data exchange is carried out between each said memory region of said internal memory and an associated memory region of said external memory by making reference to a corresponding value stored in said tag memory.

7. The data processor of claim 6, wherein each said tag memory comprises:
   a tag comparator part for receiving a memory address from said processing unit to decide which memory region is an object of access; and
   a memory count part for receiving a trigger signal from said tag comparator part to perform count-up operations.

8. The data processor of claim 1, wherein said data exchange is carried out with respect to a memory region having a specified storage capacity,
   and wherein said buffer part is a buffer memory having a storage capacity greater than a storage capacity of said memory region,
   and wherein said data exchange is carried out between said internal memory and said external memory by temporarily writing data into said buffer memory.

9. The data processor of claim 8, wherein a plurality of buffer memories are provided.

10. The data processor of claim 1, wherein said memory control unit has a plurality of access ports for accessing a plurality of external memories, and wherein data exchange is carried out between said external memories respectively coupled to said access ports and said internal memory.

11. The data processor of claim 1, wherein said data exchange is carried out when data, which has been received from said internal memory or from said external memory as an object of data exchange, is being output to an external unit.

12. A data processor, comprising:

an internal memory;

a processing unit for performing specified data processing operations while performing read/write operations on said internal memory, and a memory control unit for performing read/write operations on an external memory, wherein said external memory includes a blank region for storing data from said internal memory, wherein said memory control unit is controllably coupled to said processing unit, wherein said blank region is operable to store data from a first memory region of said internal memory, and said first memory region is operable to write data from a second memory region of said external memory, thereby enabling an exchange of data between said internal memory and said external memory, such that no regions corresponding to the internal memory exist in the external memory, wherein said memory control unit or said processing unit is provided with a comparator for comparing a data item from said internal memory with another data item from said external memory, and wherein, if said comparator indicates that said data items are different from each other, the data items are written into said internal memory or into said external memory to exchange the data items between said internal memory and said external memory.

13. The data processor of claim 12, wherein said processing unit or said memory control unit is provided with blank-region identification bits corresponding to respective memory regions of said external memory.

* * * * *